United States Patent
Pudney et al.

(10) Patent No.: US 8,810,395 B2
(45) Date of Patent: Aug. 19, 2014

(54) HARDWARE EQUIPMENT HIRE CABINET

(75) Inventors: Mark Pudney, Essex (GB); Peter John Hatherell, Wiltshire (GB)

(73) Assignee: Ashtead Plant Hire Company Limited, Cheshire (GB)

( * ) Notice: Subject to any disclaimer, the term of this patent is extended or adjusted under 35 U.S.C. 154(b) by 58 days.

(21) Appl. No.: 12/969,348

(22) Filed: Dec. 15, 2010

(65) Prior Publication Data

US 2011/0140887 A1    Jun. 16, 2011

(51) Int. Cl.
*G08B 21/00*    (2006.01)

(52) U.S. Cl.
USPC .............. 340/540; 340/572.1; 705/1.1; 705/5

(58) Field of Classification Search
USPC .............. 340/540, 572.1–572.9; 705/1, 1.1, 5
See application file for complete search history.

(56) References Cited

U.S. PATENT DOCUMENTS

| | | | | |
|---|---|---|---|---|
| 5,438,447 | A * | 8/1995 | Kunii ........................ | 359/200.1 |
| 6,195,006 | B1 * | 2/2001 | Bowers et al. ............ | 340/572.1 |
| 6,424,260 | B2 * | 7/2002 | Maloney .................... | 340/568.1 |
| 6,438,447 | B1 * | 8/2002 | Belka et al. ................ | 700/214 |
| 6,708,879 | B2 * | 3/2004 | Hunt ............................ | 235/385 |
| 7,036,729 | B2 * | 5/2006 | Chung ........................ | 235/385 |
| 7,211,972 | B2 * | 5/2007 | Garcia et al. ............... | 318/16 |
| 2002/0118111 | A1 * | 8/2002 | Brown et al. ............ | 340/573.1 |
| 2003/0120509 | A1 * | 6/2003 | Bruch et al. ................ | 705/1 |
| 2004/0122688 | A1 * | 6/2004 | Janda .......................... | 705/1 |
| 2009/0224875 | A1 * | 9/2009 | Rabinowitz et al. ...... | 340/5.53 |
| 2010/0277277 | A1 | 11/2010 | Green et al. | |
| 2011/0178630 | A1 | 7/2011 | Green et al. | |

FOREIGN PATENT DOCUMENTS

| | | |
|---|---|---|
| EP | 0239110 | 9/1987 |
| EP | 1321873 | 6/2003 |
| EP | 1321876 | 6/2003 |
| EP | 1324246 | 7/2003 |
| GB | 2396731 | 6/2004 |
| GB | 2396731 A | 6/2004 |
| GB | 2396731 B | 3/2006 |
| WO | WO 97/15031 | 4/1997 |
| WO | WO 2005/028165 | 3/2005 |
| WO | WO 2008/060440 | 5/2008 |

OTHER PUBLICATIONS

UK Intellectual Property Office, Search Report Under Section 17, GB 0921853.8, dated Apr. 15, 2010.

(Continued)

*Primary Examiner* — George Bugg
*Assistant Examiner* — Edny Labbees
(74) *Attorney, Agent, or Firm* — Ice Miller LLP

(57) ABSTRACT

Hardware equipment hire cabinet. An automated hardware equipment hire cabinet is provided in which the hiring of pieces of hardware equipment is monitored by the use of individual tags being read by tag readers such that their removal and replacement can be monitored and hire times and service intervals monitored. In at least one exemplary embodiment of a hardware equipment hire cabinet of the present disclosure, the cabinet comprises a hardware equipment storage area comprising a plurality of equipment bays, a hire tracking system comprising a first equipment sensor configured to detect removal of a piece of equipment from an equipment bay and to electronically store hire data concerning such removal, and a quarantine system comprising a dedicated quarantine area and a second equipment sensor configured to detect the presence of a quarantined piece of equipment in the quarantine area and to electronically store quarantine data.

17 Claims, 1 Drawing Sheet

(56) References Cited

OTHER PUBLICATIONS

A-Plant successfully launches its unmanned Auto Tool Hire Unit; http://www.4hsolutions.com/news-and-events/article/a-plant-launches-unmanned-auto-tool-hire-unit. (Aug. 7, 2010).

A-Plant automates tool-rental trailers with RFID; http://www.rentalpulse.com/Article/Tabid/95/smid/1276/ArticleID/12859/reftab/685/t/default.aspx. (Aug. 8, 2010).

A-Plant Auto Tool Hire Unit Wins Coveted Institute of Water Award; http://www.aplant.com/news/a-plant-auto-tool-hire-wins-coveted-institute-of-water-award. (Nov. 23, 2010).

Swedberg, Claire; RFID Journal Article RFID Automates A-Plant's Tool-Rental Trailers; http://www.rfidjournal.com/article/view/7799. (Aug. 6, 2010).

Swedberg, Claire; RFID Journal Article "Tool Tracking Goes Mobile" describing US company Cribmaster's trailer-mounted tool tradeking facility; Cribmaster has been contacted for further information; http://www.rfidjournal.com/article/view/5144. (Aug. 18, 2009).

Choctaw Tool Tracker Automated Inventory Control. http://www.choctawtooltracker.com/tool_tracker. (Date unknown, 3rd page dated 2011).

OAT Systems RFID-enabled Applications Reference Guide which discusses real-time RFID tool tracking. (2009).

A White Paper on RFID Technology in the Construction Industry by CoreRFID Ltd, a UK company. Multiple references in this document to RFID tool tracking; Core RFID Ltd 2009; first published Jun. 2008; revised & updated Jun. 2009.

Third party observation from European Patent Office dated Aug. 6, 2012.

European Search Report.

* cited by examiner

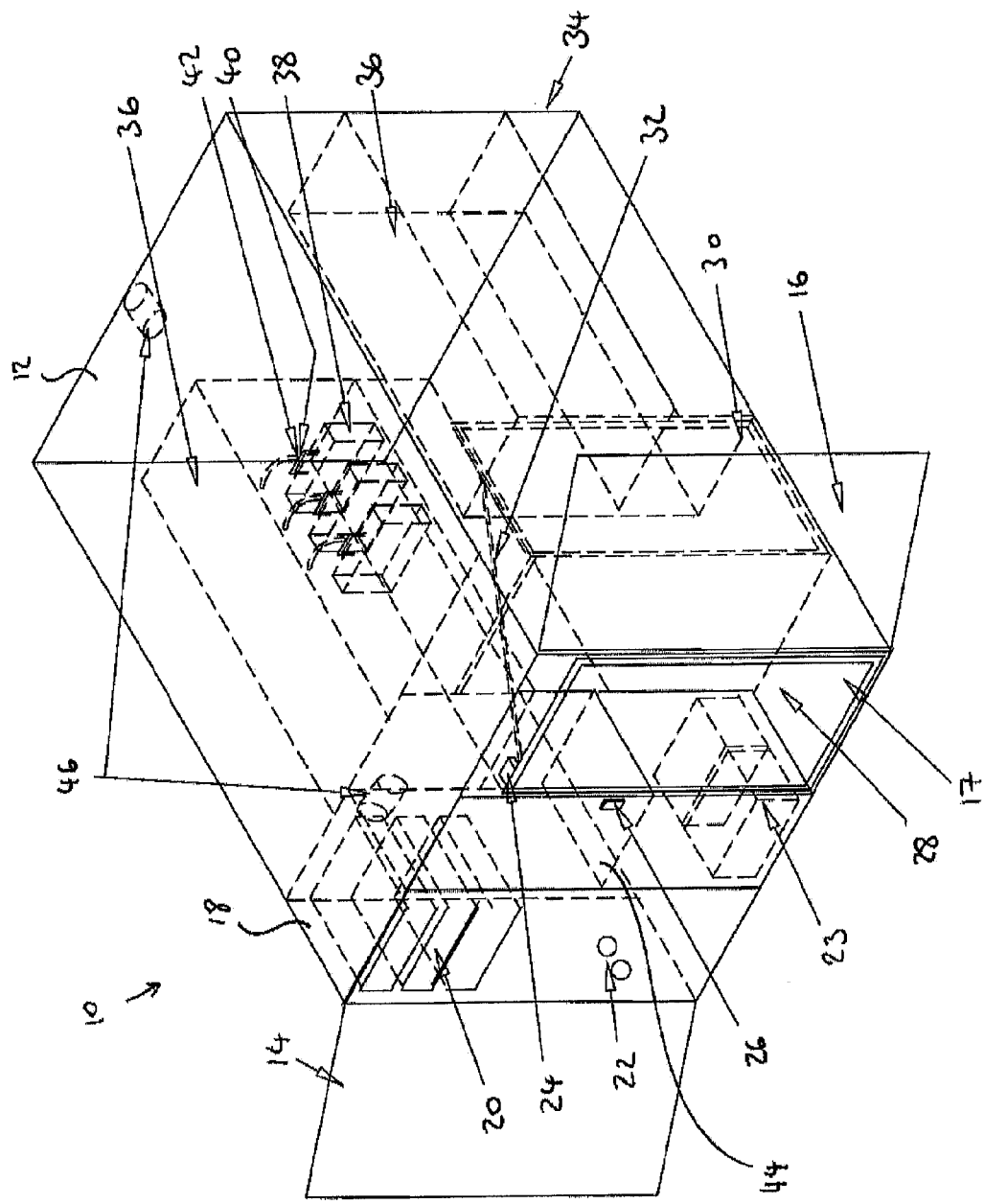

HARDWARE EQUIPMENT HIRE CABINET

PRIORITY

The present application is related to, and claims the priority benefit of, United Kingdom Patent Application Serial No. 0921853.8, filed Dec. 15, 2009, the contents of which are hereby incorporated by reference into this disclosure in their entirety.

BACKGROUND

Many building and construction sites hire hardware equipment for use when undertaking projects. The hire of hardware equipment is often preferable to purchasing equipment. This is because there is no need for the hiring party to maintain the hire equipment, and furthermore, any fluctuating demand in the need for equipment can be easily met by a hire company having significant numbers of tools.

A problem with hiring equipment is that time and effort is required in order to obtain the equipment, (i.e. collect it or have it delivered) and to return it. Because of this inconvenience, equipment is often hired for a longer period than required. For example, if the equipment is only required twice over the period of a few days, it may be more convenient for the hiring party to hire it for the span of those few days rather than to return and collect it twice. As such, the inconvenience of obtaining hired equipment can result in inefficient use of the equipment.

In addition, hired equipment needs to be serviced regularly as its duty cycle is often more demanding than that of purchased equipment. It is not easy to determine how much a certain piece of hardware equipment has been used. As such, hired equipment may experience the problem of failing on site and requiring replacement. Although hire companies will often replace such equipment free of charge, it provides further inconvenience to the hiring party. It is very difficult for the hire company to monitor their equipment whilst it is on site with the hiring party as, generally speaking, they would not have access to the equipment during this period. As such, it can be extremely difficult to determine how long the piece of equipment has been in service and/or how many times it has been used.

A further problem is that the status of a broken or damaged piece of equipment is not always communicated to the hire company. Therefore the hire company cannot react to the damage or breaking of equipment until it is returned. Inevitably the hiring party will not want to pay for the continued hire of broken equipment, and as such whilst it is in the possession of the hiring party it is not making any money for the hire company.

It is an aim of the present disclosure to overcome or at least mitigate one or more of the above problems.

BRIEF SUMMARY

The disclosure of the present application provides with a hardware equipment hire cabinet. In at least one embodiment, the present disclosure is provides an automated hardware equipment hire cabinet which monitors removal and replacement of items of hardware equipment.

According to at least one embodiment of the present disclosure, there is provided a hardware equipment hire cabinet comprising a hardware equipment storage area comprising a plurality of equipment bays, a hire tracking system comprising an equipment sensor configured to detect removal of a piece of equipment from an equipment bay and to store hire data concerning such removal.

Advantageously, the cabinet can be placed on site with the hiring party and filled with equipment which may be required during the course of the project. The hiring party can then retrieve equipment when it is needed and replace it once they have finished with it. By providing the equipment cabinet as an onsite storage facility the hiring party is more inclined to regularly replace equipment not being used and by doing so a detailed record of when and for how long each piece of equipment is used will be created. Not only does this provide more effective use of resources for the hiring party in terms of being charged only for the duration in which the equipment is used, but also the hire company will have a detailed report of the duration and frequency of use of each piece of equipment. This makes it easier to determine when the pieces of equipment need to be serviced or maintained.

In at least one embodiment, the cabinet comprises a quarantine system comprising a dedicated quarantine area and a second equipment sensor configured to detect the presence of a quarantined piece of equipment in the quarantine area and to electronically store quarantine data.

In at least one exemplary embodiment of a hardware equipment hire cabinet of the present disclosure, the cabinet comprises a hardware equipment storage area comprising a plurality of equipment bays, a hire tracking system comprising a first equipment sensor configured to detect removal of a piece of equipment from an equipment bay and to electronically store hire data concerning such removal, and a quarantine system comprising a dedicated quarantine area and a second equipment sensor configured to detect the presence of a quarantined piece of equipment in the quarantine area and to electronically store quarantine data. In another embodiment, the quarantine system is configured to produce an alert upon detection of a quarantined piece of equipment. In yet another embodiment, the second equipment sensor is configured to recognize multiple pieces of equipment. In an additional embodiment, the quarantine system is configured to produce an alert if a quarantined piece of equipment is removed from the dedicated quarantine area.

In at least one exemplary embodiment of a hardware equipment hire cabinet of the present disclosure, the quarantine system is configured to prevent egress from the cabinet by controlling a door lock if a quarantined piece of equipment is removed from the dedicated quarantine area. In an additional embodiment, the quarantine system is configured to wirelessly control a switch in the piece of equipment when placed in the dedicated quarantine area. In yet an additional embodiment, the quarantine system is configured to cut power to the equipment bay if an associated piece of equipment is quarantined to prevent further electrical charging. In another embodiment the first equipment sensor and/or the second equipment sensor is/are configured to detect replacement of the piece of equipment and to electronically store hire data concerning such replacement.

In at least one exemplary embodiment of a hardware equipment hire cabinet of the present disclosure, the first equipment sensor and/or the second equipment sensor comprises a scanner arranged to determine the identity of a piece of equipment. In another embodiment, the scanner is a RFID tag reader.

In at least one exemplary embodiment of a hardware equipment hire cabinet of the present disclosure, the hardware equipment storage area is a room. In another embodiment, the room comprises a controlled access system, the controlled access system requiring identification of a user to grant access to the room, wherein the controlled access system is configured to transfer electronic identity data concerning the identity of the user to the hire tracking system, and wherein the hire tracking system is configured to store the electronic identity data in a database with the hire data to enable subsequent identification of the user. In yet another embodiment, the hire tracking system is configured to store access data comprising an exit time of the user from the controlled access system and to store the access data in a database with the hire data to determine the time at which the piece of equipment left the cabinet. In an additional embodiment, wherein the exit time of the user is determined by activation of the controlled access system from inside the cabinet.

In at least one exemplary embodiment of a hardware equipment hire cabinet of the present disclosure, the cabinet comprises a hardware equipment storage area comprising a plurality of equipment bays, a hire tracking system comprising a first equipment sensor configured to detect removal of a piece of equipment from an equipment bay and to electronically store hire data concerning such removal, and a quarantine system comprising a dedicated quarantine area, and a second equipment sensor configured to detect the presence of a quarantined piece of equipment in the quarantine area and to electronically store quarantine data, the second equipment sensor further configured to recognize multiple pieces of equipment, the quarantine system is configured to produce an alert upon detection of a quarantined piece of equipment. In another embodiment, the quarantine system is configured to produce an alert if a quarantined piece of equipment is removed from the dedicated area. In yet another embodiment, the first equipment sensor and/or the second equipment sensor is/are configured to detect replacement of the piece of equipment and to electronically store hire data concerning such replacement. In an additional embodiment, the hardware equipment storage area is a room comprising a controlled access system, the controlled access system requiring identification of a user to grant access to the room, wherein the controlled access system is configured to transfer electronic identity data concerning the identity of the user to the hire tracking system, and wherein the hire tracking system is configured to store the electronic identity data in a database with the hire data to enable subsequent identification of the user.

In at least one exemplary embodiment of a hardware equipment hire cabinet of the present disclosure, the cabinet comprises a hardware equipment storage area comprising a plurality of equipment bays, a hire tracking system comprising a first equipment sensor configured to detect removal of a piece of equipment from an equipment bay and to electronically store hire data concerning such removal, and a quarantine system comprising a dedicated quarantine area, and a second equipment sensor configured to detect the presence of a quarantined piece of equipment in the quarantine area and to electronically store quarantine data, the second equipment sensor further configured to recognize multiple pieces of equipment, the quarantine system configured to produce an alert upon detection of a quarantined piece of equipment, to produce an alert if a quarantined piece of equipment is removed from the dedicated area, and to cut power to the equipment bay if an associated piece of equipment is quarantined to prevent further electrical charging. In another embodiment, the hardware equipment storage area is a room comprising a controlled access system, the controlled access system requiring identification of a user to grant access to the room, wherein the controlled access system is configured to transfer electronic identity data concerning the identity of the user to the hire tracking system, wherein the hire tracking system is configured to store the electronic identity data in a database with the hire data to enable subsequent identification of the user and further configured to store access data comprising an exit time of the user from the controlled access system and to store the access data in a database with the hire data to determine the time at which the piece of equipment left the cabinet.

BRIEF DESCRIPTION OF THE DRAWINGS

An example hardware equipment hire cabinet will now be described with reference to the accompanying drawing, in which:

FIG. 1 is a perspective hidden line view of an exemplary hardware equipment hire cabinet in accordance with the present disclosure.

DETAILED DESCRIPTION

Referring to FIG. 1, there is provided an automated hardware equipment hire cabinet 10. The cabinet 10 comprises a metal outer shell 12 having four walls, a ceiling and a base. The cabinet 12 is similar to a transport container and is sufficiently strong to be hoisted onto a lorry or transporter and transported from site to site. The shell 12 is the size of a room such that individuals are able to enter and exit in order to retrieve one or more pieces of hardware equipment as will be described below.

The shell 12 comprises a maintenance door 14 and an access door 16 both hinged at opposite sides of the shell 12. A service compartment 18 is provided behind the maintenance door 14 and contains computers 20 as will be described below.

The service compartment 18 also contains transformers (not shown) connected to electrical terminals 22. The transformers charge a series of 12V batteries 23 which power the computers 20 and further electrical equipment contained within the cabinet 10. The transformers output a low voltage DC electrical current and are powered by an on-site connection to the electrical terminals 22 which may be 240 volt AC.

The access door 16 opens outwardly and is securable by a mechanical lock. A screen door 17 is situated behind the access door 16 and is securable by a computer controlled magnetic lock 24. The screen door 17 is constructed from mesh material so an external user can see whether the cabinet 10 is in use. The magnetic lock 24 is connected to a card reader 26 on the exterior of the cabinet 10 which comprises a red/green LED indicator. Normally, the LED indicator of the card reader 26 will be red when the screen door 17 is closed and locked by the magnetic lock 24. If the hiring party swipes a valid card through the card reader 26 then a green LED will be illuminated and the magnetic lock 24 will be deactivated in order to allow opening of the screen door 17.

Once the screen door 17 has been opened, a user can step into the lobby area 28. Access to the main part of the cabinet 10 is possible through an intermediate door 30 which is connected to the screen door 17 via a mechanical linkage 32 such that only one of intermediate door 30 and the screen door 17 can be opened at any given time. As such, once the screen door 17 has closed behind the hiring party, the intermediate door 30 will open allowing access to the main part of the cabinet 10.

The main part 34 of the cabinet 10 is a room comprising a number of shelves 36, holding a number of different items of various hardware equipment 38. Each of the pieces of hardware equipment 38 comprises an electronic tag 40 such as an RFID tag. Proximate each item of hardware equipment 38 there is a reader 42 attached to the cabinet 10 which is configured to determine whether the tag 40 is proximate the tag reader or has been removed. The tag readers 42 are connected to the computer 20 in order to log the time of removal and replacement of each of the pieces of hardware equipment 38. It will be understood that each tag 40 is individual and specific to that piece of hardware equipment. The use of each piece of equipment can thereby be individually monitored to determine when the service interval draws near.

Once the hiring party has retrieved the equipment they require they place it onto a shelf 44 in the lobby area 28. Once they have retrieved all of the equipment they need, they then enter the lobby area closing the intermediate door 30 behind them which will cause the screen door 17 to open. They then remove the equipment that has been hired for use. When exiting the cabinet 10, the hiring party must again swipe their card on an inside portion of the card reader 26 to release the lock 24.

In this way, the computer 20 can record the exact time that the tools are removed from the cabinet 10 thus avoiding the hiring party being charged for any time they may have taken in selecting their tool, or in collecting a number of tools on the shelf 44.

The computer 20 keeps a record of who the hiring party is, (as indicated by the particular swipe card used), what pieces of equipment have been removed and for how long they are removed.

The cabinet 10 also comprises CCTV cameras 46 which are used to monitor activity within the main part 34 and the lobby area 28. If any of the pieces of hardware equipment 38 are powered by battery, the shelves 36 may be provided with charging points. In particular, docking stations on the shelves may receive the piece of hardware equipment or case in which it is disposed in order to simultaneously connect a charging point and to read the tag 40 thus ensuring that each piece of equipment is charged once it is replaced.

According to the present disclosure, a quarantine shelf or area is provided within the cabinet 10 which is clearly marked for storage of equipment which has failed or has become damaged in use.

In use, the hiring party would place the equipment to be quarantined onto the quarantine shelf where a sensor would read the associated RFID tag to identify the piece of equipment. Several things will happen in response to this.

Firstly, the hire company will be notified that a piece of equipment has been quarantined so that they can send a replacement or a technician to repair the equipment.

Secondly, the piece of equipment is monitored on the quarantine shelf, and its removal generates an alert. The alert may be audible and/or visible to the hiring party to notify them that they are about to remove a damaged piece of equipment.

The system may intervene and block egress from the cabinet 10 (except in emergencies) by locking the door electronically. It will be noted that use of damaged equipment may be dangerous, and the system will be taking action to prevent such use and therefore harm to the hiring party.

The system is configured to communicate to the hiring party (e.g. by email) to inform them that a piece of equipment has been quarantined.

As mentioned above, the computer 20 keeps a record of all equipment, and the database stored on the computer 20 will be updated so that the piece of equipment is marked "quarantined" and the hire company can investigate the potential for refunding or discounting the hiring party's invoice.

Optionally, each piece of equipment may incorporate a remote controlled master switch which can prevent operation if activated. The quarantine system may comprise a wireless transmitter for activating the master switch of any quarantined equipment.

The system also blocks power to the bay for the tool to be quarantined, such that any charging power supply to the piece of quarantined equipment if placed in the bay is cut off automatically.

Once the job has finished, the cabinet 10 can be returned to the hire company at which point the information recorded throughout the hire period can be used to generate an invoice in respect of the hiring activity undertaken during the period in which the cabinet 10 was on site.

It is envisaged that alternative energy sources such as solar power or wind power may be employed in the cabinet with use of either wind turbines or solar panels installed on the outer shell 12.

Consumables will also be stored within the cabinet and will be monitored on a count in/count out basis. These may include tape, discs, drills, bits, batteries, etcetera.

The hire cabinet will use a live connection to the hiring party so that the equipment therein can be continuously monitored. Therefore the cabinet may be connected to wired or wireless communication means.

Instead of a mechanical linkage 32 between the screen door 17 and the intermediate door 30, these doors may be controlled by electronic locks which only permit one to open when the other is closed—i.e. providing effectively the same function as the mechanical linkage 32.

Various alerts to the hire company may be produced, for example, if:

(i) The cabinet contains emergency break boxes to release electronic locks on the doors which are used.
(ii) The cabinet power supply is interrupted.
(iii) The mains supply is restored.
(iv) The cabin is accessed but no one leaves after a predetermined time.

The system may determine that a piece of equipment is "on charge" within a predetermined time from removal from the bay, e.g. 15 to 20 minutes. This permits replacement after inspection or erroneous removal without the hiring party being charged.

According to the present disclosure, a remote access system is provided by which the hiring party can view the status of the cabinet (e.g. what is on hire, quarantined, available etc).

While various embodiments of hardware equipment hire cabinets and methods for using the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

What is claimed is:

1. A hardware equipment hire cabinet, comprising:
a hardware equipment storage area comprising a plurality of equipment bays for the removal and return of pieces of equipment;
a hire tracking system comprising a first equipment sensor configured to detect removal of a piece of equipment from an equipment bay and to electronically store hire data concerning such removal; and
a quarantine system comprising a dedicated quarantine area distinct from the hardware equipment storage area, and a second equipment sensor configured to detect the presence of a quarantined piece of equipment in the quarantine area, to electronically store quarantine data distinct from the hire data, to produce a specific quarantine alert automatically upon detection of the piece of equipment in the quarantine area, and to produce an automatic alert if a quarantined piece of equipment is removed from the dedicated quarantine area.

2. The hardware equipment hire cabinet of claim 1, wherein the second equipment sensor is configured to recognize multiple pieces of equipment.

3. The hardware equipment hire cabinet of claim 1, wherein the quarantine system is configured to prevent egress from the cabinet by controlling a door lock if a quarantined piece of equipment is removed from the dedicated quarantine area.

4. The hardware equipment hire cabinet of claim 1, wherein the quarantine system is configured to wirelessly control a switch in the piece of equipment when placed in the dedicated quarantine area.

5. The hardware equipment hire cabinet of claim 1, wherein the quarantine system is configured to cut power to the equipment bay if an associated piece of equipment is quarantined to prevent further electrical charging.

6. The hardware equipment hire cabinet of claim 1, wherein the first equipment sensor is configured to detect replacement of the piece of equipment and to electronically store hire data concerning such replacement.

7. The hardware equipment hire cabinet of claim 1, wherein the first equipment sensor comprises a scanner arranged to determine the identity of a piece of equipment.

8. The hardware equipment hire cabinet of claim 7, wherein the scanner is a RFID tag reader.

9. The hardware equipment hire cabinet of claim 1, wherein the hardware equipment storage area is a room.

10. The hardware equipment hire cabinet of claim 9, wherein the room comprises a controlled access system, the controlled access system requiring identification of a user to grant access to the room, wherein the controlled access system is configured to transfer electronic identity data concerning the identity of the user to the hire tracking system, and wherein the hire tracking system is configured to store the electronic identity data in a database with the hire data to enable subsequent identification of the user.

11. The hardware equipment hire cabinet of claim 10, wherein the hire tracking system is configured to store access data comprising an exit time of the user from the controlled access system and to store the access data in a database with the hire data to determine the time at which the piece of equipment left the cabinet.

12. The hardware equipment hire cabinet of claim 11, wherein the exit time of the user is determined by activation of the controlled access system from inside the cabinet.

13. A hardware equipment hire cabinet, comprising:
a hardware equipment storage area comprising a plurality of equipment bays for the removal and return of pieces of equipment;
a hire tracking system comprising a first equipment sensor configured to detect removal of a piece of equipment from an equipment bay and to electronically store hire data concerning such removal; and
a quarantine system comprising:
a dedicated quarantine area distinct from the hardware equipment storage area, and
a second equipment sensor configured to detect the presence of a quarantined piece of equipment in the quarantine area and to electronically store quarantine data distinct from the hire data, the second equipment sensor further configured to recognize multiple pieces of equipment,
the quarantine system is configured to produce an automatic alert upon detection of a quarantined piece of equipment, and to produce an automatic alert if a quarantined piece of equipment is removed from the dedicated quarantine area.

14. The hardware equipment hire cabinet of claim 13, wherein the first equipment sensor is configured to detect replacement of the piece of equipment and to electronically store hire data concerning such replacement.

15. The hardware equipment hire cabinet of claim 13, wherein the hardware equipment storage area is a room comprising a controlled access system, the controlled access system requiring identification of a user to grant access to the room, wherein the controlled access system is configured to transfer electronic identity data concerning the identity of the user to the hire tracking system, and wherein the hire tracking system is configured to store the electronic identity data in a database with the hire data to enable subsequent identification of the user.

16. A hardware equipment hire cabinet, comprising: a hardware equipment storage area comprising a plurality of equipment bays for the removal and return of pieces of equipment; a hire tracking system comprising a first equipment sensor configured to detect removal of a piece of equipment from an equipment bay and to electronically store hire data concerning such removal; and
a quarantine system comprising:
a dedicated quarantine area distinct from the hardware equipment storage area, and
a second equipment sensor configured to detect the presence of a quarantined piece of equipment in the quarantine area and to electronically store quarantine data distinct from the hire data, the second equipment sensor further configured to recognize multiple pieces of equipment,
the quarantine system configured to produce an automatic alert upon detection of a quarantined piece of equipment, to produce an automatic alert if a quarantined piece of equipment is removed from the dedicated area, and to cut power to the equipment bay if an associated piece of equipment is quarantined to prevent further electrical charging.

17. The hardware equipment hire cabinet of claim 16, wherein the hardware equipment storage area is a room comprising a controlled access system, the controlled access system requiring identification of a user to grant access to the room, wherein the controlled access system is configured to transfer electronic identity data concerning the identity of the user to the hire tracking system, wherein the hire tracking system is configured to store the electronic identity data in a database with the hire data to enable subsequent identification of the user and further configured to store access data comprising an exit time of the user from the controlled access system and to store the access data in a database with the hire data to determine the time at which the piece of equipment left the cabinet.

* * * * *